United States Patent Office 3,737,352
Patented June 5, 1973

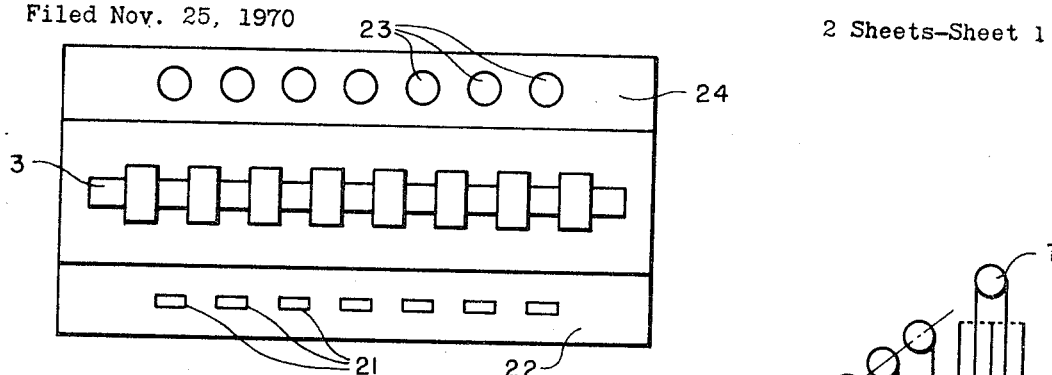
FIG_2
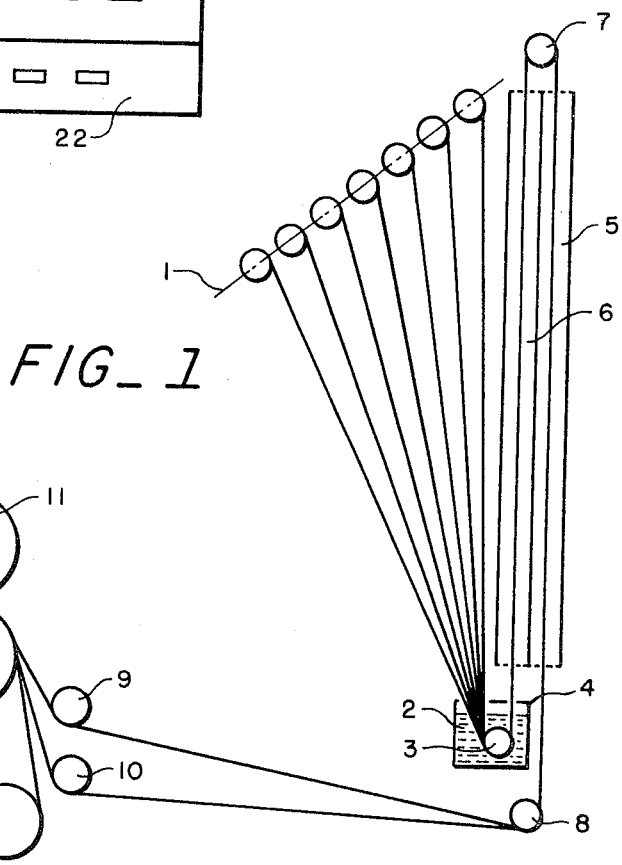
FIG_1
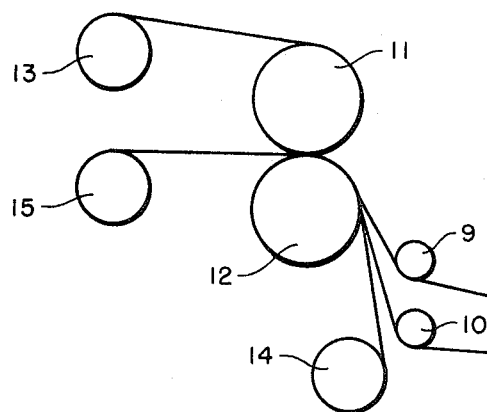
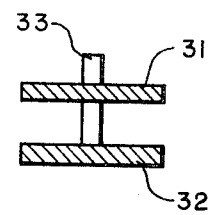
FIG_3    FIG_3a
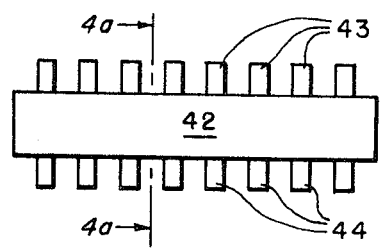    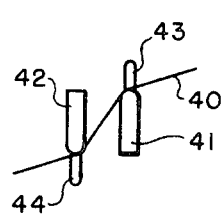
FIG_4    FIG_4a

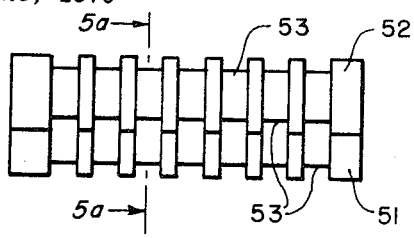
FIG_5
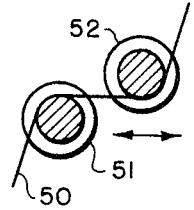
FIG_5a
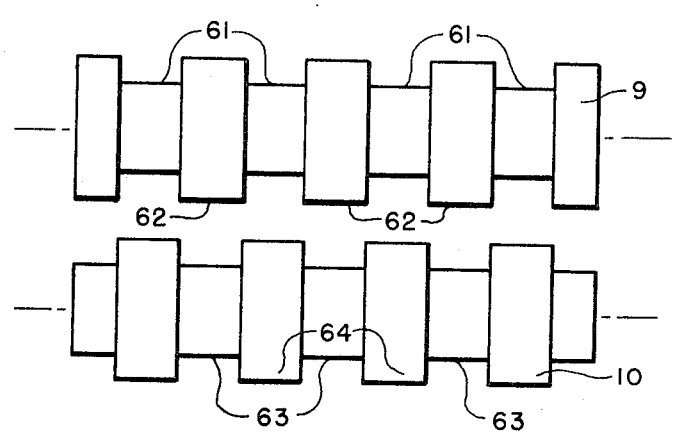
FIG_6
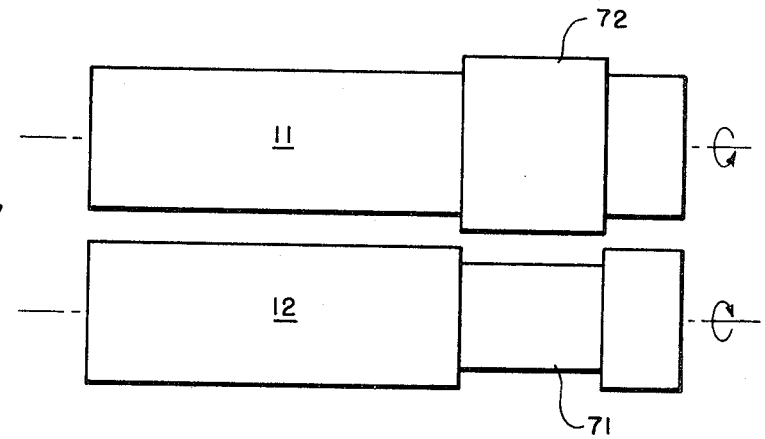
FIG_7
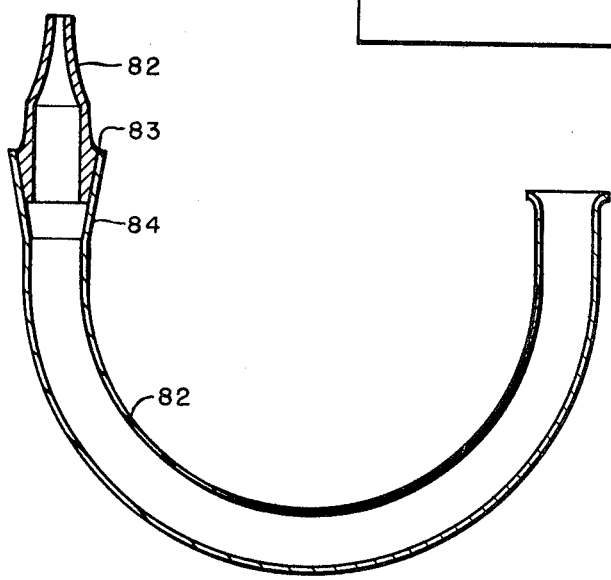
FIG_8

3,737,352
REINFORCED PLASTICS MATERIALS
Victor Arthur Avis, Cambridge, and Albert John Matthews, Duxford, England, assignors to Ciba-Geigy AG, Basel, Switzerland
Filed Nov. 25, 1970, Ser. No. 92,786
Claims priority, application Great Britain, Nov. 28, 1969, 58,434/69
Int. Cl. B29h 9/04
U.S. Cl. 156—181      11 Claims

ABSTRACT OF THE DISCLOSURE

The invention relates to process for producing a resin-impregnated tape from a plurality of tows of fibres which comprises
impregnating the said tows with a solution of a first resin in a volatile solvent,
shaping each tow into the form of a ribbon of substantially constant width,
removing substantially all the solvent from each ribbon,
aligning the impregnated ribbons in an abutting edge-to-edge relationship, and
contacting the upper and lower surfaces of the aligned ribbons with a second resin under conditions such that the said second resin flows about the ribbons to form a coherent resin-impregnated tape therefrom.

---

This invention relates to reinforced plastics, in particular to fibre-reinforced plastics materials in tape form, and to a method for the production of such materials.

Plastics materials reinforced with fibres, especially with glass fibres, have achieved considerable commercial importance, being used, for example, in the construction of aircraft, boats, buildings, pipelines, and storage tanks. These reinforced plastics materials may be manufactured by either the "wet lay-up" or the "dry lay-up" techniques.

The latter method, which is being used increasingly, employs a preimpregnated reinforcement, generally known as a "prepreg," comprising the reinforcement in the form of a fabric, chopped strand mat, or unidirectional tape or sheet impregnated with a resin. The resin is usually applied as a composition which has been carefully formulated with the correct proportion of such components as hardeners, fillers and catalysts. Often the resin component is a liquid and thermosettable, and the composition has been treated so that the resin has been advanced to the solid, but still fusible and curable, B-stage during preparation of the prepreg. Such a B-stage resin can then be fully cured when desired, e.g. after the prepreg has been formed into some desired configuration. Use of prepregs has the advantage over the wet lay-up technique of relieving the manufacturer of fibre-reinforced materials of many of the problems associated with the storage and handling of the resin components and generally yields a product having a more uniform distribution of resin.

Conventional fibre-reinforced plastics materials are less stiff than many metals, and this has precluded their use in certain applications, for example in the manufacture of compressor blades in jet engines. Recently, however, carbon fibres have been used as reinforcement for plastics materials to give products with high strength and stiffness coupled with low weight. Other fibrous reinforcing materials which are now used are made of boron, silicon carbide, silicon nitride, and alumina.

Carbon fibres are supplied as tows or rovings of continuous fibres wound together onto a cylindrical former without deliberate insertion of twist, so that the fibres are more or less parallel. The cylindrically-wound tow on the cylindrical former is generally known as a "cheese." A typical tow contains about 10,000 individual fibres.

Because carbon fibres are difficult to handle, being, for example, very light and brittle, methods which have been successfully used for making resin-impregnated glassfibre tapes cannot readily be applied to making resin-impregnated tapes of carbon fibres.

Carbon fibre prepregs in sheet form have been produced by dipping a number of tows into a dilute solution of resin in a volatile solvent, laying the impregnated tows down side by side, exactly parallel and without overlap, and then rolling the tows to even thickness with a heated roller. In another method, unimpregnated tows are laid down side by side then covered with a film of resin and rolled with a heated roller to consolidate the sheet.

These methods are very slow and uneconomic, and efforts have therefore been made to produce continuously tapes of impregnated carbon fibres from two or more tows. The tape produced is generally between about 1 cm. and 15 cm. wide and has a thickness of about 0.1 cm. or less. Users of these tapes have stringent requirements. Thus, the tape must not be trimmed along the edges and its width must not vary by more than about 1.25 mm.; there must be no voids between individual tows forming the tape; the tows must lie straight and be free from wrinkles; the individual tows forming the tape must hold together during subsequent handling operations; and the density of the tape should be constant over the full width.

The present invention provides a process and apparatus for the production of resin-impregnated tapes.

According to one feature of the present invention, there is provided a process for producing a resin-impregnated tape from a plurality of tows of fibres, especially carbon fibres, which comprises impregnating the said tows of fibres with a solution of a first resin in a volatile solvent, shaping each tow into the form of a ribbon of substantially constant width, removing substantially all the solvent from each ribbon, aligning the impregnated ribbons in an abutting edge-to-edge relationship, and contacting the upper and lower surfaces of the aligned ribbons with a second resin, preferably in the form of a continuous film, under conditions such that the said second resin flows about the ribbons to form a coherent resin-impregnated tape therefrom.

The second resin is generally caused to flow about the aligned ribbons by heating and applying pressure. When either or both resins are thermosettable, the conditions used to cause the second resin to flow about the aligned ribbons may be chosen such that the thermosettable resin is converted from the A-stage into a solid, but still fusible, B-stage product. Production of such B-stage materials requires great care, for if the conversion is carried too far, the resin will be converted into the fully cured, insoluble and infusible C-stage, and this renders the tape useless for further processing.

Preferably, therefore, the resins, especially the second resin, are chosen so that the aligned ribbons will bond together without the second resin being converted into a B-stage product, i.e. the second resin remains predominantly in the A-stage. Tapes produced in this manner have a longer useable life ("shelf-life") than those wherein the resin has been converted into a B-stage product.

The present invention also provides an apparatus for producing resin-impregnated tapes from a plurality of tows of fibres, especially carbon fibres, which comprises
Means for impregnating a plurality of tows of the fibres with a solution of a first resin,
Means for shaping each tow into the form of a ribbon of substantially constant width,
Means for aligning the impregnated ribbons, from which substantially all the solvent has been removed, in an abutting edge-to-edge relationship, Means for contacting the upper and lower surfaces of the aligned ribbons with a second resin, Means for causing the said second resin to flow about the ribbons to form a coherent resin-impregnated tape therefrom, and Means for advancing the tows through the apparatus.

In order that the invention will be more fully understood, the following description is given with reference to the drawings accompanying the provisional specification in which:

FIG. 1 is an overall schematic elevational view illustrating a preferred embodiment of the apparatus of the invention;

FIG. 2 is a plan view of a bath which may be used to impregnate carbon fibre tows;

FIG. 3 is a plan view of one type of shaping device used to shape the tows, with, in FIG. 3a, a sectional elevation taken on the line 3'—3';

FIG. 4 is a plan view of a second type of shaping device, with, in FIG. 4a, a sectional elevation taken on the line 4'—4';

FIG. 5 is a plan view of a third type of shaping device, with, in FIG. 5a, a sectional elevation taken on the line 5'—5';

FIG. 6 is a sectional elevation of rollers for aligning the ribbons in an abutting edge-to-edge relationship;

FIG. 7 is an elevational view of nip rollers used to cause the second resin to flow about the fibres of the aligned ribbons; and FIG. 8 is an elevational view of a tubular impregnating bath.

With the exception of FIG. 8, the drawings illustrate apparatus suitable for forming tape from seven tows of carbon or other fibres. It will be understood that this is for illustrative purposes only. The number of tows used depends on the width of tape and on the fibre density required.

Referring to FIG. 1, reels, or cheeses, of carbon fibre tow are suspended in a framework 1 so that they lie above a tank 2 containing resin solution for impregnating the tows. The reels are suspended with their longitudinal axes parallel in a horizontal plane such that individual tows may be taken to the impregnating bath without intertwining. The reels are free to rotate as the tows are pulled from them. If desired, the tows may be heated prior to their entry into the impregnating bath 2; this ensures that the fibres are free from moisture and sometimes aids impregnation.

To ensure complete impregnation, the tows are preferably passed under a freely rotatable roller 3 suspended near the bottom of the tank 2. In place of the roller 3 a fixed smooth-surfaced rod can be used.

After impregnation, the tows pass from the tank 2 through a shaping device 4 which shapes each tow into the form of a ribbon while constraining the spread of the tows and "metering" the resin pick-up (i.e. controlling the amount of resin solution retained by the fibres). The ribbons pass from the shaping device 4 to a drying device which may be a tube of suitable cross section heated externally, e.g. by an electric heating jacket. This tube may lie in a horizontal or vertical plane. Preferably, the tows remain in the drying device long enough to remove at least most of the solvent, but the temperature and the duration of heating are such that no appreciable reaction occurs between components of the resin. In FIG. 1 the drying device consists of an oven 5 comprising a vertical tube heated by an electrical heating jacket, and the impregnated ribbons pass up one side of the tube, over a freely rotatable roller 7 suspended above the tube, and down the other side. The tube should be sufficiently wide so that the impregnated ribbons are in no danger of touching the heated sides. To prevent transfer of solvent from the still solvent-wet ribbons passing up one side to the dried ribbons passing down the other side, the tube may be fitted with a central, solvent-impermeable division 6.

The dry, impregnated ribbons are then passed to a device which aligns them in an abutting edge-to-edge relationship. This device may be in the form of channels separated by vertical guide walls or pegs, a comb or, as illustrated, two grooved rollers 9 and 10. In FIG. 1, the ribbons are shown emerging from the base of the oven and passing to the aligning device via a roller 8. This roller is not free to rotate, it creates tension in the tows and helps to ensure that the fibres lie parallel in the final tape.

The aligned ribbons then pass to a device in which continuous films of a resin are applied to their upper and lower surfaces and the resin is caused to flow about the fibres to form a coherent structure. Preferably, this is achieved in one step, the means both for applying the continuous films of a resin and the means for causing the resin to flow about the fibres comprising two form rollers (11 and 12) heated and biased together such that, when the aligned ribbons are fed into the nip between the rollers with the films of resin, the resin flows about the fibres to form a coherent, impregnated tape. The tape is wound up on a reel 15 for storage until required. It is generally necessary that a releasable interlay be wound up with the tape to prevent adhesion between adjacent layers. The resin may have a strippable backing sheet, e.g. of polyethylene or paper, on the face opposite to that brought into contact with the aligned ribbons. These sheets may either be removed after the tape has been formed by the rollers 11 and 12 or left on the tape to act as the releasable interlay. In the apparatus of FIG. 1, the reel 15 is driven by an electric motor (not shown) capable of maintaining a selected, constant speed. Movement of this reel pulls the fibres through the apparatus.

FIG. 2 illustrates one form of the impregnating bath. The container may be of any suitable material, such as metal, glass, plastics, or glass fibre-reinforced plastics. As mentioned above, the tows may be passed under a freely rotatable roller 3 suspended near the bottom of the tank to ensure complete impregnation. This roller is preferably grooved, as illustrated in FIG. 2, and each tow passes round the roller in a separate groove. The grooves at their base are preferably the same width as the contribution in width that each tow is required to make to the overall width of the final tape. Thus, for example, if seven tows are to be aligned side-by-side to form a tape 7 cm. wide, then each tow contributes 1 cm. to the overall width of the tape and the grooves in the roller are 1 cm. wide at their base. The tows are flattened to some extent by passage round the roller and this facilitates passage of the tows through the shaping device through which they pass on leaving the impregnating bath, where they undergo further flattening, and where the excess resin solution is removed.

Generally, the shaping device is such that, although the tows are flattened considerably, the ribbons produced are thicker than the final tape, the thickness of which can be regulated at the rollers 11 and 12.

The shaping device may have slots, through which tows pass, cut or formed in metal, glass or other suitable material. Preferably, the length of each slot is equal to the width contribution that each tow is required to make to the final tape. In FIG. 2, the shaping device is a series of slots 21 cut in a metal sheet 22 which may form a partial lid to the tank 2. The upper and lower edges of the slots may be rounded. The shaping devices may also be hollow cones, the upper ends of which have been flattened to form the necessary slot-like openings and the lower ends may have a circular cross-section and engage in correspondingly shaped orifices cut in the lid of the tank 2. A nozzle of this type is shown in FIG. 8 attached to a tubular impregnation bath.

The shaping device may also take the form of two hard surfaces between which the impregnated tows are passed, the surfaces having means to constrain the sideways spread, i.e. the width of the ribbons. Preferably, the constraining means are placed so that the width of each ribbon is equal to the width contribution which that ribbon makes to the overall width of the final tape. The constraining means may be pegs fixed to, or grooves cut into, the surfaces. The surface and pegs are formed in any hard-wearing material which can be made very smooth, e.g. glass or a metal such as brass or steel.

One type of such a shaping device is illustrated in FIGS. 3 and 3a. Two plates 31 and 32, separated by a distance equal to or greater than the thickness of tape required, are held vertically above the impregnating bath. The tows pass between the plates and are held separate and constrained by a series of pegs 33 fixed to plate 32 and passing through holes in plate 31. The distance between the plates may be adjusted by moving plate 31 along the pegs.

A second type of such a shaping device is shown in FIGS. 4 and 4a. Two plates 41 and 42 are held, spaced apart horizontally, above the impregnating bath. Each plate has on one side pegs 43 or 44 which are preferably separated by the width contribution required from each tow. The distance apart of the plates is not critical and they may, if desired, be moved horizontally so that they are not in the same vertical plane. Each tow 40 passes from the bath up beside plate 41, between a pair of pegs 43, then between the plates and up past the edge of plate 42 between a pair of pegs 44. The edges of the plates 41 and 42 between the pegs may be rounded.

A still further type of such a shaping device is illustrated in FIGS. 5 and 5a. This comprises two grooved rods 51 and 52 mounted and spaced apart horizontally above the impregnating bath: they are held so that they do not rotate but may be adjusted relative to each other to create a greater or lesser degree of wrap for the tows 50. The width of grooves 53 in each rod is preferably equal to the width contribution that each ribbon makes to the final tape.

Reverting to FIG. 1, the tows may be passed directly into the impregnating bath and pulled round the roller 3, but the very light carbon fibres tend to float in the resin solution in an uncontrolled, irregular manner. This tendency can result in the tapes having an uneven fibre density, and so it is preferred to pass each tow into the bath through an entry port which controls or restrains the fibres during their passage to the roller 3. The entry port may be a gap between two teeth of a comb, or a small circular hole cut in a plate of metal or other suitable material. Particularly good results have been obtained using circular eyelets 23 sunk into holes cut into a metal plate 24 as shown in FIG. 2. The eyelets may be of any suitable hard-wearing, very smooth material such as ceramic, metal, or glass. The distribution of the ports over the surface of the tank, and their separation, depend on the width and density of the tape required.

Instead of all the tows being passed through one bath, each tow may be passed through a separate impregnating solution held, for example, in a U-shaped tube such as that shown in FIG. 8. As illustrated, the impregnating bath comprises a glass tube 81, having, for example, an internal diameter of about 2 cm. and bent to a radius of about 5 cm. The nozzle comprises a flattened glass tube 82 having a conically shaped end portion 83, the exterior surface of which is ground to fit into a correspondingly ground socket 84 fitted to the end of the U-shaped tube.

Preferably, rollers 7 and 8 at the top and bottom of the drying tower, as shown in FIG. 1, are grooved in the same manner as the roller 3. The impregnated, dried ribbons leaving roller 8 may, as mentioned above, be aligned in abutting edge-to-edge relationship by passing them down channels so that, at the end of the channels, the ribbons lie in the same horizontal plane in the required relationship. However, in a preferred embodiment, aligning of the dry ribbons is achieved using two grooved surfaces, the width of the grooves and of the raised areas between the grooves being equal to the width contribution that each ribbon makes to the overall width of the final tape, and the grooves on one surface being aligned with the raised areas between the grooves on the second surface, so that ribbons passing through the grooves on one surface are aligned in an abutting edge-to-edge relationship with ribbons passing through the grooves on the second surface. The grooved surface may be two comb-like structures made of metal but it is preferable to use two grooved rollers (9 and 10). FIG. 6 illustrates in section a pair of rollers for forming a tape from seven ribbons.

The upper roller 9 has four grooves 61 separated by three lands 62. The width of each groove and each land preferably equals the width of each ribbon. The lower roller 10 has three grooves 63 separated by two lands 64, the lands and grooves being the same width as those of the upper roller; the grooves of the lower roller are in the same vertical plane as the lands on the upper roller, and the lands of the lower roller are in the same vertical plane as the grooves on the upper roller.

The seven ribbons leaving roller 8 are divided, four passing over the upper roller 9 in the four grooves 61 and three passing under the lower roller 10 in the three grooves 63.

The rollers 9 and 10 are situated as close to the rollers 11 and 12 as possible, so that ribbons leaving rollers 9 and 10 pass on quickly to the nip of rollers 11 and 12, where they are pressed into an abutting edge-to-edge relationship.

The rollers 11 and 12 may each have a plane surface, but preferably one roller has, adjacent to the rollers 9 and 10, a circumferential groove which is of the width required in the final tape while the other roller has a matching shoulder which fits into the groove. Such rollers are illustrated at FIG. 7. The nip between the groove 71 and the shoulder 72 is preferably adjustable so that tapes may be produced of various thicknesses.

As the aligned ribbons pass from the rollers 9 and 10 to the nip of rollers 11 and 12, continuous films of a resin are applied to both upper and lower surfaces from reels 13 and 14 (see FIG. 1). One or both of the rollers 11 and 12 may be heated to aid flow of the resin about the fibres. Preferably, the continuous films of resin have a strippable backing sheet which passes through the nip of the rollers 11 and 12 and prevents the resin from adhering to the rollers. If the films of resin have no backing sheet, means should be provided to prevent the resin and/or tape from adhering to the rollers, such as coating the rollers with a material which will not adhere to the resin or by arranging for a suitable interlay, e.g. in the form of a loop, to pass continuously between the rollers and the components of the tape.

The film of resin may be of a thermosetting or thermoplastic resin, or a mixture of both types.

Suitable resins which may be made into films, which include a curing agent if necessary, may be single thermosettable resins, such as an epoxide resin (i.e. a substance containing on average more than one 1,2-epoxide group per molecule), a resole formed from a phenol such as phenol itself and an aldehyde such as formaldehyde, an unsaturated polyester, a silicone resin, a melamine resin or a furan resin, or may be mixtures of thermosettable resins. Preferably they also contain a thermoplastic resin which is not heat-curable. Examples of such compositions are: resoles with, as the thermoplastic component, a poly-(vinyl acetal) or a nylon; a Novolac formed from a phenol such as phenol itself and formaldehyde or other aldehyde, with a neoprene rubber or an acrylonitrile rubber; and epoxide resins, with a phenoxy resin (i.e. a polyarylene polyhydroxy polyether, substantially free from 1,2-epoxide groups, which is a copolymer of a dihydric phenol with either a diglycidyl ether of a dihydric phenol or with epichlorohydrin, and contains recurring units of the formula

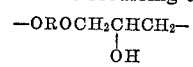

where R denotes an arylene group), a polysulphone (i.e.

a polymer containing recurring units represented by the formula —RSO$_2$—, where R has the meaning previously assigned), or a copolymer of an α-olefin hydrocarbon and an α-olefin which is an ester of ε carboxylic acid.

Suitable thermoplastic resin compositions may contain only one thermoplastic resin, such as a polycarbonate, a polyoxymethylene, a polyimide, a poly(benzimidazole), or a polyamide, or it may contain a mixture of thermoplastic resins.

As already stated, these resins are preferably applied as films, powders are usually inconvenient to use, especially with carbon and other light, brittle fibres. They are made into films in a conventional manner. Manipulating a film of resin is often easier if it has tacky surfaces; these may be produced by coating the film with a substance which retains its tackiness during storage of the film at room temperature but which is itself cured to a hard, insoluble, infusible resin under the conditions used in subsequent processing of the tape. In many cases, however, films of thermosettable resin compositions, even those containing a thermoplastic resin which is not heat-curable, already possess adequate tackiness under the conditions employed for impregnating the carbon fibres.

The resin used in the impregnating bath may be the same as the second resin or it may be different. It may even be of a different type. Thus an epoxide resin may be used to impregnate the tows while the second resin may be a mixture of a phenolic resole with a poly(vinyl acetal).

Any suitable volatile solvent may be used to form the impregnating solution. Clearly, the drying device must be at a temperature sufficiently high to remove substantially all the solvent from the tape.

The concentration of non-volatile resinous substances in the impregnating solution depends largely on the desired total resin content of the tape and the proportion of that content which is to be applied as the film in the second resin treatment. The best proportions of resin to be applied at each stage can be determined readily by experimentation. In general, optimum results are obtained when the greater proportion of resin is applied as the second resin. Preferably therefore, less than 40%, especially less than 25%, by volume of the total resin present in the final tape is applied during the first, i.e. the impregnation, stage. The minimum proportion of resin applied in the first stage is in practice about 5%, and preferably at least 10%, by volume is applied.

The speed at which the tows are pulled through the apparatus depends to some extent on the size of the entry ports and gaps in the nozzles. Good results have been obtained with speeds of 1–10 metres per minute, especially 0.6 to 1.2 metres per minute.

Carbon fibre tapes produced by the process of the invention may be used directly as produced, or tapes can be laid edge-to-edge to produce a larger sheet. In either case, a laminated product may be produced by cutting sections of tape or sheet to the desired shape, stacking the sheets together and consolidating using heat and pressure. To give the product greater strength, some laminae may be cut so that, when they are stacked, the carbon fibres lie at an angle to those in adjacent laminae.

The following example illustrates the invention. Unless otherwise specified, parts are by weight.

The resins employed were as follows.

"Epoxide resin A" was a polyglycidyl ether, prepared in a known manner from 2,2-bis(4-hydroxyphenyl)propane and epichlorohydrin in the presence of an alkali, having an epoxide content in the range 5.0–5.2 equiv./kg. and a viscosity at 21° C. in the range 200–400 poises.

"Epoxide resin B" was a polyglycidyl ether prepared in a similar manner but having a 1,2-epoxide content in the range 0.25 to 0.42 equiv./kg. and a softening point (Durrans) in the range 145° to 155° C.

"Epoxide resin C" was a polyglycidyl ether prepared similarly, but having a 1,2-epoxide content in the range 1.9 to 2.2 equiv./kg. and a softening point (Durrans) in the range 64 to 76° C.

EXAMPLE

Epoxide resin A (100 parts), Epoxide resin C (100 parts), and dicyandiamide (10 parts) were dissolved in methoxyethanol (2000 parts by volume) to form an impregnating solution.

Epoxide resin A (80 parts) and Epoxide resin B (100 parts) were heated at 150° C. in a Z-blade mixer. When the mixture had become homogeneous, it was cooled to 100° C. and a milled mixture comprising 20 parts Epoxide resin A and 10 parts dicyandiamide was incorporated. The mixture was cast into a film 0.1 mm. thick.

The impregnating solution was placed in a bath partially covered by a metal lid containing seven entry ports. These ports comprised circular ceramic eyelets of diameter 0.4 cm., set in holes cut through the metal lid. A freely rotatable roller having seven circumferential grooves 0.363 cm. wide was suspended close to the bottom of the bath.

Above the side of the bath remote from the entry ports there were suspended two brass plates, as illustrated in FIG. 4. The plates, each 1.3 cm. wide and 14.5 cm. long, were fitted on one side as illustrated with eight steel pegs 1 cm. long and 0.363 cm. apart. The plates were 2 cm. apart, and were suspended horizontally above the side of the bath so that the pegs on the lower plate pointed toward the side of the bath fitted with the entry ports and the pegs on the upper plate pointed in the opposite direction.

A drying tower, mounted vertically above these plates, was 305 cm. high and fitted with a central vertical divider. It was heated by means of electric heating tape wound round it. A freely rotatable roller, of 9.0 cm. diameter and having seven circumferential grooves each 0.363 cm. wide, was suspended above the tower and a similar roller was suspended below it.

Seven tows were passed through the ports into the impregnating bath, under the roller suspended in the bath, and from the bath through the horizontal plates by which they were shaped into ribbons. Each tow was held separate from the next and constrained by being caused to lie in a groove in the roller and to pass through a gap between two of the steel pins fixed to the plates.

The ribbons, each still held separate, were passed up one side of the drying tower, over the grooved roller at the top, and down the other side. The tower was held at a constant temperature of 70° C.

The ribbons were then separated and passed to two grooved rollers as illustrated in FIG. 6. The rollers, which were suspended with their axes in a horizontal plane, were 5.50 cm. apart. The rollers had circumferential grooves as illustrated, the grooves and lands each being 0.363 cm. long. Situated immediately adjacent to these rollers was a pair of heated nip rollers, as illustrated in FIG. 7. The groove in the lower roller, and the shoulder on the upper, were each 2.54 cm. wide. The rollers were biased in contact with each other by means of adjustable springs.

Four of the seven ribbons taken alternately were passed from the roller at the base of the tower into the grooves in the upper roller, while the three intermediate ribbons were passed into the grooves under the lower roller. In this way the seven ribbons were brought together edge-to-edge to form a tape 2.54 cm. wide which passed almost immediately into the groove of the heated nip rollers. As the tape passed into the nip, it was contacted on both the upper and lower surfaces with the continuous film of resin supported on a releasable paper backing 2.54 cm. wide.

The nip rollers were heated to 70° C. and the springs were adjusted so that the tape was $3.56 \times 10^{-2}$ cm. thick.

The tape was wound on a reel, driven such that the tows passed through the apparatus at 0.6 metre per minute, without removing the paper backing from the two films of resin, so that the backing remained in place as a releasable interlay.

Laminates prepared by laying up strips of the tape so formed could be consolidated by heating for 1 hour at 170° C. under a pressure of 7 kg./sq. cm.

What is claimed is:

1. Process for producing a resin-impregnated tape from a plurality of tows of carbon fibers which comprises impregnating the said tows with a solution of a first resin in a volatile solvent, shaping each two into the form of a ribbon of substantially constant width, removing substantially all the solvent from each ribbon, aligning the impregnated ribbons in an abutting edge-to-edge relationship, and contacting the upper and lower surfaces of the aligned ribbons with a second resin in the form of a continuous fusible film under conditions such that the said second resin flows about the ribbons to form a coherent fusible resin-impregnated tape therefrom.

2. A resin-impregnated tape when produced by the process of claim 1.

3. Process according to claim 1, wherein the second resin is caused to flow about the aligned ribbon by applying heat.

4. Process according to claim 1, wherein the second resin is caused to flow about the aligned ribbons by applying pressure.

5. Process according to claim 1, wherein at least one of the said first and second resins is thermosettable.

6. Process according to claim 5, wherein the second resin is a thermosettable A-stage resin and the conditions used to cause it to flow about the aligned ribbons are such that the said second resin is converted into a solid, but still fusible B-stage product.

7. Process according to claim 5, wherein the second resin is a thermo-settable A-stage resin and the conditions used to cause it to flow about the aligned ribbons are such that the said second resin remains predominantly in the A-stage.

8. Process according to claim 1, wherein less than 40% by volume of the total resin present in the final stage is applied during the first stage.

9. Process according to claim 8, wherein less than 25% by volume of the total resin present in the final tape is applied during the first stage.

10. Process according to claim 1 wherein at least 5% by volume of the total resin present in the final tape is applied during the first stage.

11. Process according to claim 10, wherein at least 10% by volume of the total resin present in the final tape is applied during the first stage.

References Cited

UNITED STATES PATENTS

| | | | |
|---|---|---|---|
| 3,042,569 | 7/1962 | Paul | 156—441 X |
| 3,052,584 | 9/1962 | Smith | 156—167 |
| 3,576,705 | 10/1967 | Goldsworthy | 156—166 X |
| 2,954,815 | 10/1960 | Kuts | 156—441 X |
| 3,388,025 | 6/1968 | Minierils et al. | 156—441 |
| 3,126,312 | 3/1964 | Nickerson | 156—166 X |
| 3,248,274 | 4/1966 | Karrass | 156—166 X |
| 3,258,378 | 6/1966 | Kelsey | 156—441 X |
| 3,224,922 | 12/1965 | Fry | 156—441 X |
| 3,210,446 | 10/1965 | Yamakawa et al. | 156—166 X |

WILLIAM D. MARTIN, Primary Examiner

B. D. PIANALTO, Assistant Examiner

U.S. Cl. X.R.

156—166 X, 180 X, 199 X